United States Patent [19]

Chapman et al.

[11] 4,228,073
[45] Oct. 14, 1980

[54] NONDIFFUSIBLE AZO DYE-RELEASING COMPOUNDS

[75] Inventors: Derek D. Chapman, Rochester; E-Ming Wu, Webster, both of N.Y.

[73] Assignee: Eastman Kodak Company, Rochester, N.Y.

[21] Appl. No.: 25,146

[22] Filed: Mar. 29, 1979

Related U.S. Application Data

[62] Division of Ser. No. 950,193, Oct. 10, 1978, Pat. No. 4,183,755, which is a division of Ser. No. 892,561, Apr. 3, 1978, Pat. No. 4,148,643.

[51] Int. Cl.$^2$ .................. C09B 29/32; C09B 33/12; C09B 33/14
[52] U.S. Cl. .................................. 260/176; 260/141; 260/146 D; 260/147; 260/149; 260/152; 260/154; 260/155; 260/156; 260/157; 260/158; 260/162; 260/163; 260/193; 260/205; 260/206; 260/207.1; 260/465 D
[58] Field of Search ............. 260/152, 155, 156, 157, 260/158, 162, 163, 176, 193, 154

[56] References Cited

U.S. PATENT DOCUMENTS

| | | | |
|---|---|---|---|
| 3,148,062 | 9/1964 | Whitmore et al. | 260/163 X |
| 4,108,850 | 8/1978 | Fields et al. | 260/162 |

*Primary Examiner*—Floyd D. Higel
*Attorney, Agent, or Firm*—Harold E. Cole

[57] ABSTRACT

Photographic elements, diffusion transfer assemblages and processes are described which employ a novel nondiffusible compound having a releasable azo dye moiety. The compound has the formula:

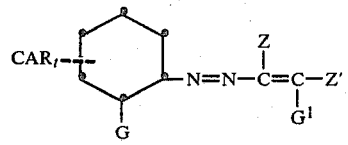

wherein:
G is a metal chelating group (or a salt or hydrolyzable precursor thereof) or a group which together with a

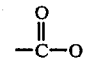

group is CAR (bonded through the oxygen);
$G^1$ is a hydroxy group (or a salt or hydrolyzable precursor thereof);
Z is an electron withdrawing group;
Z' is alkyl, aryl or $N(R)_2$ (R being H, alkyl or aryl);
CAR is a ballasted carrier moiety; and
t is 0 or 1.

The dye can be transferred imagewise to an image-receiving layer where it can be contacted with metal ions to form a metal-complexed azo dye transfer image of excellent stability. The retained dye image in the photographic element can also be bleached, fixed and metallized to form a color transparency or a motion picture film.

16 Claims, No Drawings

NONDIFFUSIBLE AZO DYE-RELEASING COMPOUNDS

This is a division of application Ser. No. 950,193, filed Oct. 10, 1978, now U.S. Pat. No. 4,183,755, which is a division of application Ser. No. 892,561 filed Apr. 3, 1978, now U.S. Pat. No. 4,148,643, filed Apr. 10, 1979.

This invention relates to photography and more particularly to color diffusion transfer photography employing certain nondiffusible azo dye-releasing compounds which, as a function of development of a silver halide emulsion layer, release a diffusible, metallizable azo dye. Highly stable metal complexes of this dye are formed in an image-receiving layer.

Azo dye developers containing metallizable groups are disclosed in U.S. Pat. Nos. 3,081,167; 3,196,014; 3,299,041; 3,453,107; 3,563,739; 3,544,545, 3,551,406 and 4,014,700. Since it is a reactive species, however, the developer moiety of such dye developers is capable of developing any exposed silver halide emulsion layer with which it comes into contact, rather than just developing the adjacent silver halide emulsion with which it is associated. Unwanted wrong-layer development, therefore, can occur in dye developer systems which results in undesirable interimage effects. Accordingly, it is desirable to provide an improved transfer system in which the attachment of the dye to a "reactive" moiety, such as a developer moiety, is avoided, so that such dye can diffuse throughout the photographic film unit without becoming immobilized in undesired areas.

In U.S. Pat. No. 4,076,529 issued Feb. 28, 1978 nondiffusible dye releasing compounds are disclosed. Among the various dye moieties disclosed which can be released are "metal complexed dyes". No specific structures are shown, however.

The April 1977 edition of Research Disclosure, pages 32 through 39, discloses various nondiffusible dye-releasing compounds and various metallized azo dye fragments. Such premetallized dyes are large molecules which diffuse more slowly than unmetallized dyes, resulting in long access times for image formation in color image transfer systems. The specific compounds employed in the instant invention, however, are not disclosed.

In accordance with our invention, we have provided improved dye-releasing compounds containing chelating dye moieties, so that the dye which is released imagewise during processing can diffuse to an image-receiving layer containing metal ions to form a metal-complexed, dye transfer image having better hues, rapid diffusion rates and shorter access times than those of the prior art, as well as good stability to heat, light and chemical reagents. Many of the dyes of the present invention, when chelated by metal ions such as nickel-(II) ions, have good yellow hue with minimal unwanted absorption outside the blue region of the spectrum. They have superior stability to fading by light in a variety of environments.

A photographic element in accordance with the invention comprises a support having thereon at least one photosensitive silver halide emulsion layer having associated therewith a nondiffusible compound having at least one diffusible azo dye moiety, said compound having the formula:

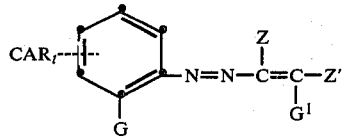

wherein:
G is a metal chelating group (any group which will donate a pair of electrons to a metal ion), a salt thereof (such as an alkali metal salt, a quaternary ammonium salt, etc) or a hydrolyzable precursor thereof (e.g., a hydrolyzable acyl or ester group); or a group which together with a

group is CAR, said CAR being bonded to the benzene ring through the oxygen of said

group;
$G^1$ is a hydroxy group or a salt thereof (such as a sodium salt, a tetramethylammonium salt, etc), or a hydrolyzable precursor thereof;
Z is an electron withdrawing group having the formula $-CON(R)_2$, $-SO_2N(R)_2$, $-COOR$, $-CN$, $SO_2R'$, or $-COR'$, wherein $R'$ is an alkyl (including substituted alkyl) group of 1 to 8 carbon atoms, such as methyl, ethyl, isopropyl, 2-sulfamoylethyl, 2-hydroxyethyl, butyl and the like; or an aryl (including substituted aryl) group of 6 to 10 carbon atoms, such as phenyl, m-hydroxyphenyl, p-sulfamoylphenyl, etc; and each R is H or $R'$;
$Z'$ is an alkyl (including substituted alkyl) group of 1 to 8 carbon atoms, such as methyl, ethyl, isopropyl, 2-sulfamoylethyl, 2-hydroxyethyl, butyl and the like; an aryl (including substituted aryl) group of 6 to 10 carbon atoms, such as phenyl, m-hydroxyphenyl, p-sulfamoylphenyl, etc; or $N(R)_2$, wherein R is defined as above;
CAR represents a ballasted carrier moiety which is capable of releasing said diffusible azo dye under alkaline conditions such as, for example, as a function (either direct or inverse) of development of the silver halide emulsion layer; and
t is an integer of 0 or 1, with the proviso that the compound contains at least one but not more than two CAR groups.

For example, G may be hydroxy; amino; carboxy; sulfonamido; sulfamoyl; a fused nitrogen-containing ring, such as a quinoline ring; or a hydrolyzable ester group having the formula $-OCOR^1$, $-OCOOR^1$, or $-COOR^1$, wherein $R^1$ is an alkyl (including substituted alkyl) group having 1 to about 8 carbon atoms, such as methyl, ethyl, isopropyl, 2-sulfamoylethyl, 2-hydroxyethyl, butyl and the like, or an aryl (including substituted aryl) group having 6 to about 12 carbon atoms, such as phenyl, p-methoxyphenyl, p-sulfamoylphenyl, etc.

Examples of hydrolyzable precursors of a hydroxy group for $G^1$ include, for example, an acyloxy group having the formula —OCOR$^1$, —OCOOR$^1$ or —O—CON(R$^1$)$_2$, wherein each R$^1$ is an alkyl group having 1 to about 8 carbon atoms, such as methyl, ethyl, isopropyl, 2-sulfamoylethyl, 2-hydroxyethyl, butyl and the like, or an aryl group having 6 to about 12 carbon atoms, such as phenyl, p-methoxyphenyl, p-sulfamoylphenyl, etc.

Other substituents may also be present on the benzene ring shown in the formula above, such as alkyl of 1 to 6 carbon atoms, alkoxy, amino, halogens, acetamido, carbamoyl, alkoxycarbonyl, solubilizing groups such as sulfonamido, sulfamoyl, carboxy, sulfo, hydrolyzable precursors thereof, etc. In a preferred embodiment of the invention, t is 1, G is OH, G$^1$ is OH, Z is —CON(R)$_2$ and Z' is an alkyl group of 1 to 8 carbon atoms.

In another preferred embodiment of the invention, CAR may have attached thereto two azo dye moieties of the formula above, in which case two dye moieties can be released from one CAR moiety.

When hydrolyzable precursors for G and G$^1$ of the dye moiety in the above formula are employed, the absorption spectrum of the azo dye is shifted to shorter wavelengths. "Shifted dyes" of this type absorb light outside the range to which the associated silver halide layer is sensitive. In some cases, the absorption spectrum of the unmetallized azo dye ligand is substantially shifted to shorter wavelengths at neutral pH (e.g., 5 to 8).

There is great latitude in selecting a CAR moiety which is attached to the azo dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that when the dye moiety is released from the compound in an image transfer system, cleavage may take place in such a position that part or all of a linking group, if one is present, and even part of the ballasted moiety may be transferred to the image-receiving layer along with the dye moiety. In any event, the dye nucleus as shown above can be thought of as the "minimum" which is transferred.

CAR moieties useful in the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; Research Disclosure 14447, April 1976; and U.S. Pat. No. 4,139,379 issued Feb. 13, 1979 of Chasman et al (dye released by miscellaneous mechanisms), the disclosures of which are hereby incorporated by reference.

In a further preferred embodiment of the invention, the ballasted carrier moiety or CAR, as described above, may be represented by the following formula:

(Ballast-Carrier-Link)

wherein:

(a) Ballast is an organic ballasting radical of such molecular size and configuration as to render the compound nondiffusible in a photographic element during development in an alkaline processing composition;

(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

a(—C=C)$_b$— wherein:
b is a positive integer of 1 to 2; and
a represents the radicals OH, SH, NH—, or hydrolyzable precursors thereof; and (c) Link represents a group which, upon oxidation of said Carrier moiety, is capable of being hydrolytically cleaved to release the diffusible azo dye. For example, Link may be the following groups:

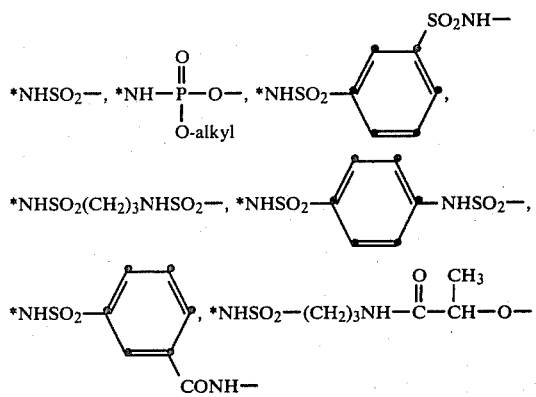

wherein *represents the position of attachment to the Carrier.

The nature of the Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the ring, etc. Useful Ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc, a keto radical having 8 to 30 carbon atoms such as —CO—C$_{17}$H$_{35}$, —CO—C$_6$H$_4$(t—C$_{12}$H$_{25}$), etc.

For specific examples of Ballast-Carrier-Link moieties useful as the CAR moiety in this invention, reference is made to the November 1976 edition of Research Disclosure, pages 68 through 74, and the April 1977 edition of Research Disclosure, pages 32 through 39, the disclosures of which are hereby incorporated by reference.

In a highly preferred embodiment of the invention, the ballasted carrier moiety or CAR in the above formulas is a group having the formula:

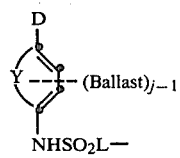

NHSO$_2$L— wherein:
(a) Ballast is an organic ballasting radical of such molecular size and configuration (e.g., simple organic groups or polymeric groups) as to render the compound nondiffusible in a photographic element during development in an alkaline processing composition;
(b) D is $OR^2$ or $NHR^3$ wherein $R^2$ is hydrogen or a hydrolyzable moiety and $R^3$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when $R^3$ is an alkyl group of greater than 8 carbon atoms, it can serve as a partial or sole Ballast);
(c) Y represents the atoms necessary to complete a benzene nucleus, a naphthalene nucleus, or a 5 to 7 membered heterocyclic ring such as pyrazolone, pyrimidine, etc;
(d) j is a positive integer of 1 to 2 and is 2 when D is $OR^2$ or $NHR^3$ when $R^3$ is hydrogen or an alkyl group of less than 8 carbon atoms; and
(e) L is a linking group which is $[X-(NR^4-J)_q]_m-$ or $X-J-NR^4-$ wherein:
 (i) X represents a bivalent linking group of the formula $-R^5-L'_n-R^5_p-$ where each $R^5$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;
 (ii) L' represents a bivalent radical selected from oxy, imino, carbonyl, carboxamido, carbamoyl, sulfonamido, ureylene, sulfamoyl, sulfinyl or sulfonyl;
 (iii) n is an integer of 0 or 1;
 (iv) p is 1 when n equals 1 and p is 1 or 0 when n equals 0, provided that when p is 1 the carbon content of the sum of both $R^5$ radicals does not exceed 14 carbon atoms;
 (v) $R^4$ represents a hydrogen atom, or an alkyl radical having 1 to about 6 carbon atoms;
 (vi) J represents a bivalent radical selected from sulfonyl or carbonyl;
 (vii) q represents an integer of 0 or 1; and
 (viii) m represents an integer of 0, 1 or 2.

Especially good results are obtained in the above formula when D is OH, j is 2, and Y is a naphthalene nucleus.

Examples of the CAR moiety in this highly preferred embodiment are disclosed in U.S. Pat. No. 4,076,529; U.S. Pat. No. 3,928,312; French Pat. No. 2,284,140; and German Pat. Nos. 2,406,664; 2,613,005; and 2,505,248, the disclosures of which are hereby incorporated by reference, and include the following:

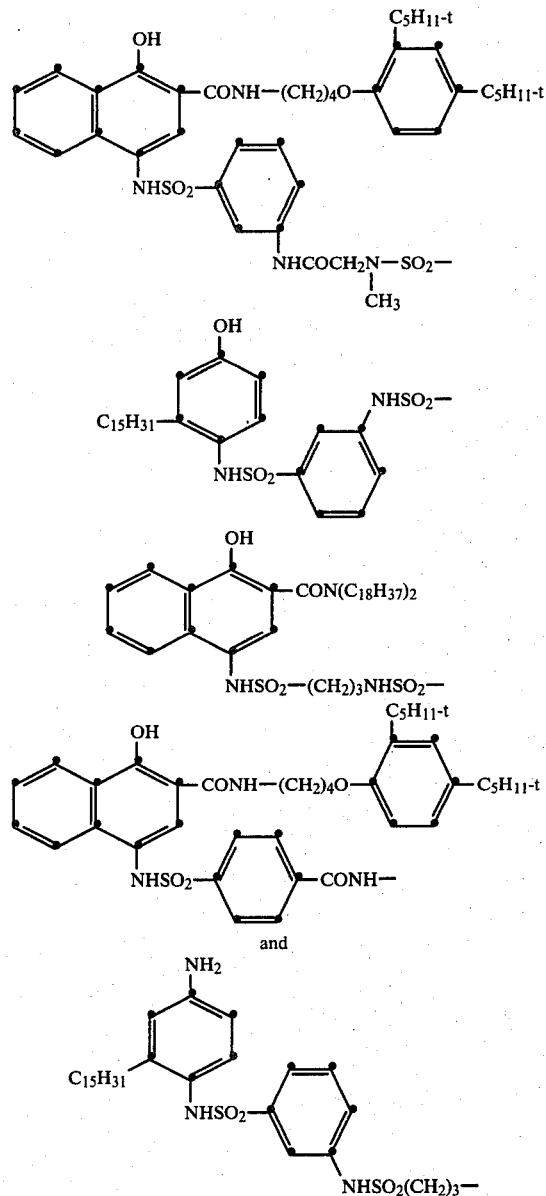

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-releasing chemistry. In one of these embodiments, the ballasted carrier moiety or CAR in the above formulas may be a group having the formula:

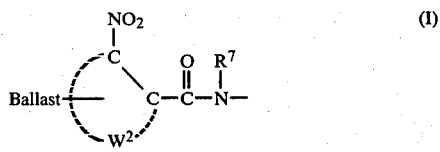

(I)

wherein:
Ballast is an organic ballasting radical of such molecular size and configuration as to render the compound nondiffusible in a photographic element during development in an alkaline processing composition;

W² represents at least the atoms necessary to complete a benzene nucleus (including various substituents thereon); and R⁷ is an alkyl (including substituted alkyl) radical having 1 to about 4 carbon atoms.

Examples of the CAR moiety in this formula I include the following:

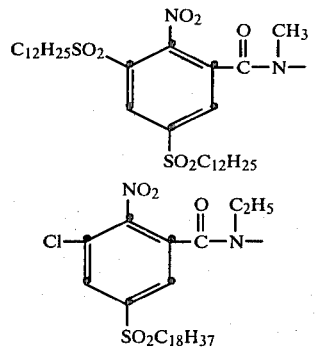

In a second embodiment of positive-working dye-release chemistry as referred to above, the ballasted carrier moiety or CAR in the above formulas may be a group having the formula:

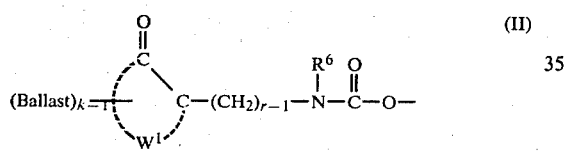

wherein:

Ballast is an organic ballasting radical of such molecular size and configuration as to render the compound nondiffusible in a photographic element during development in an alkaline processing composition;

W¹ represents at least the atoms necessary to complete a quinone nucleus (including various substituents thereon);

r is a positive integer of 1 or 2;

R⁶ is an alkyl (including substituted alkyl) radical having 1 to about 40 carbon atoms or an aryl (including substituted aryl) radical having 6 to about 40 carbon atoms; and k is a positive integer of 1 to 2 and is 2 when R⁶ is a radical of less than 8 carbon atoms.

Examples of the CAR moiety in this formula II include the following:

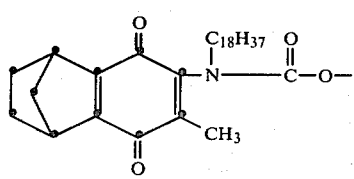

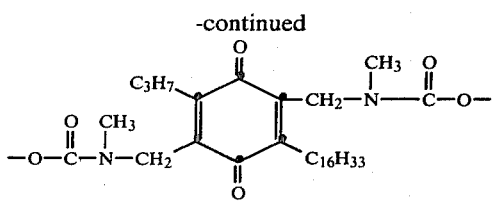

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 Chasman et al, issued Feb. 13, 1979, the disclosure of which is hereby incorporated by reference.

In a third embodiment of positive-working dye-release chemistry as referred to above, the ballasted carrier moiety or CAR in the above formulas may be a group having the formula:

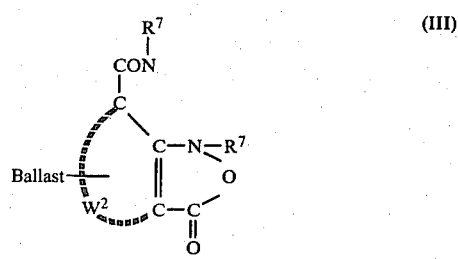

wherein:

Ballast, W² and R⁷ are as defined for formula I above.

Examples of the CAR moiety in this formula III include the following:

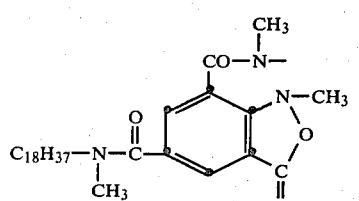

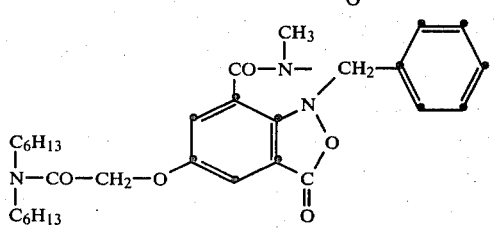

For further details concerning this particular CAR moiety, including synthesis details, reference is made to commonly assigned copending U.S. Application Ser. No. 534,966 of Hinshaw et al, filed Dec. 20, 1974, the disclosure of which is hereby incorporated by reference.

In a fourth embodiment of positive-working dye-release chemistry as referred to above, the ballasted carrier moiety or CAR in the above formulas may be a group having the formula:

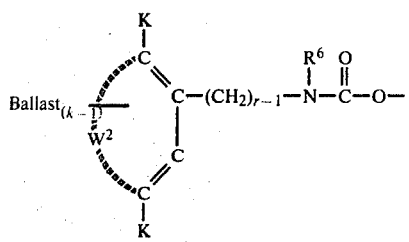
(IV)

wherein:
Ballast, r, $R^6$ and k are as defined for formula II above;
$W^2$ is as defined for formula I above; and
K is OH or a hydrolyzable precursor thereof.

Examples of the CAR moiety in this formula IV include the following:

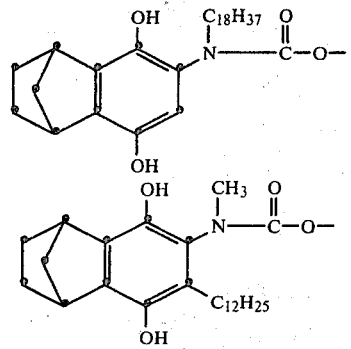

For further details concerning this particular CAR moiety, including synthesis details, reference is made to U.S. Pat. No. 3,980,479 of Fields et al, issued Sept. 14, 1976, the disclosure of which is hereby incorporated by reference.

A bivalent linking group, e.g., L or X as defined above, may be used, if desired, to link the CAR moiety described in formulas I through IV above to the dye moiety previously described.

Other examples of CAR include the following:

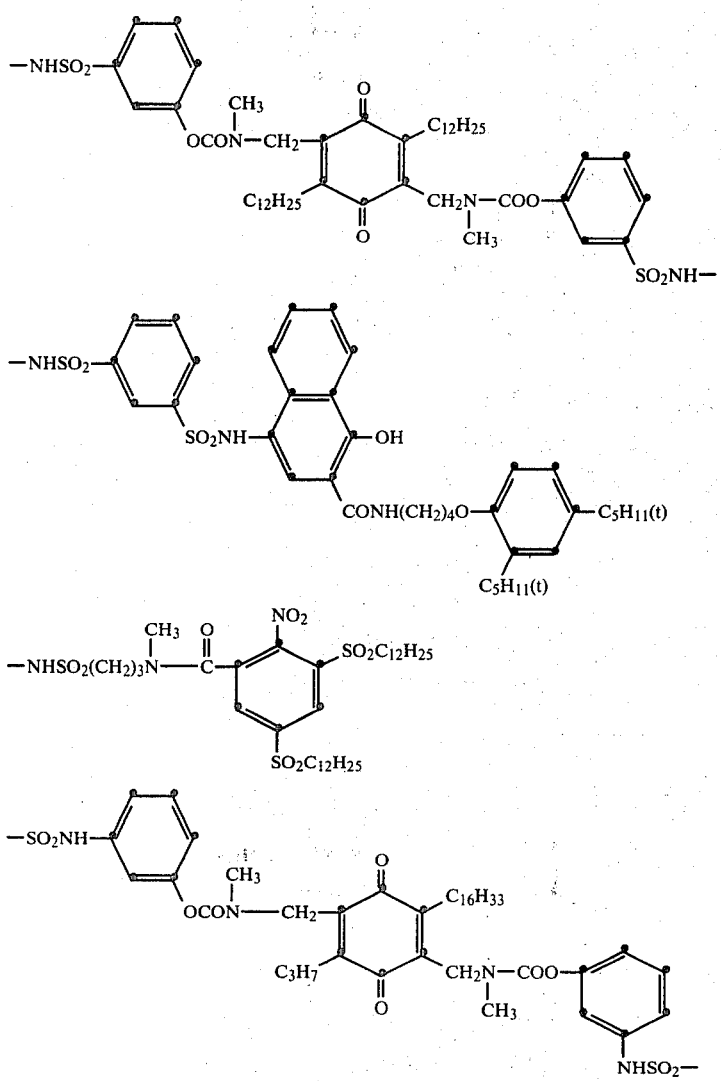

-continued
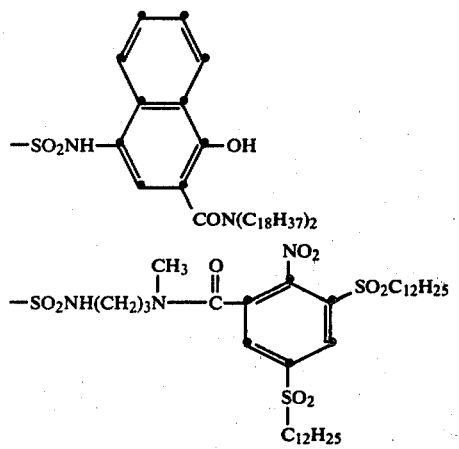
Representative compounds included within the scope of the invention include the following:
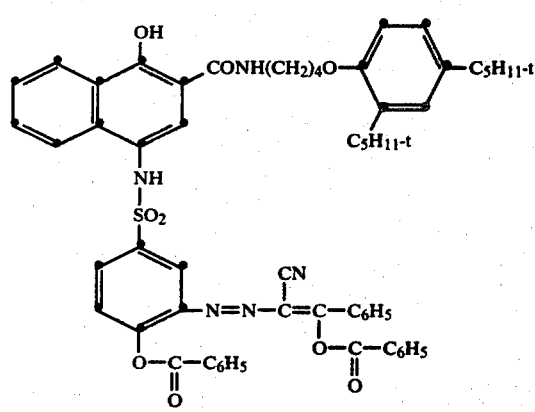 (1)
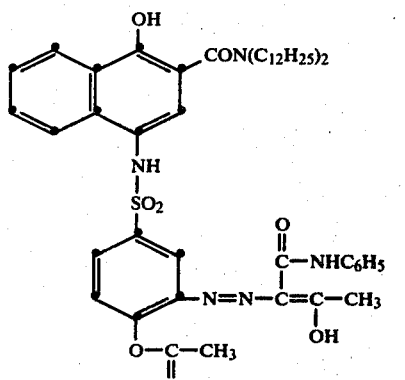 (2)
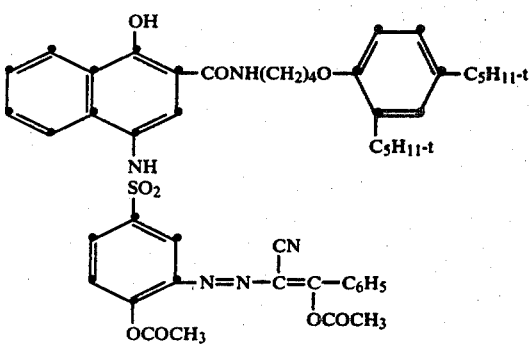 (3)

-continued
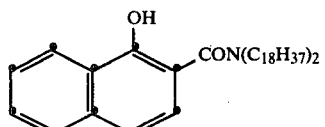 (4)
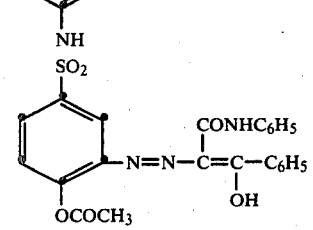 (5)
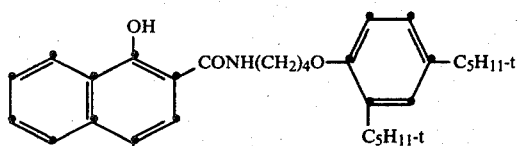 (6)
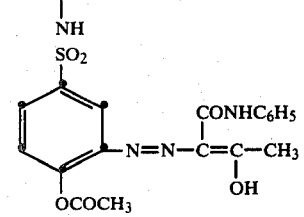 (7)
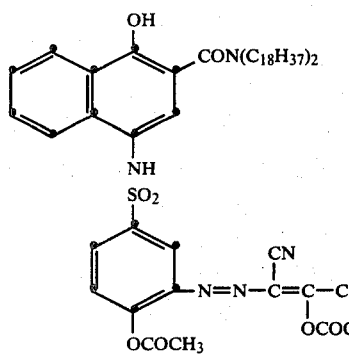
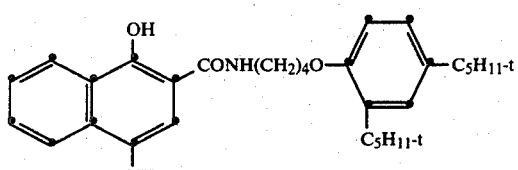
(8)
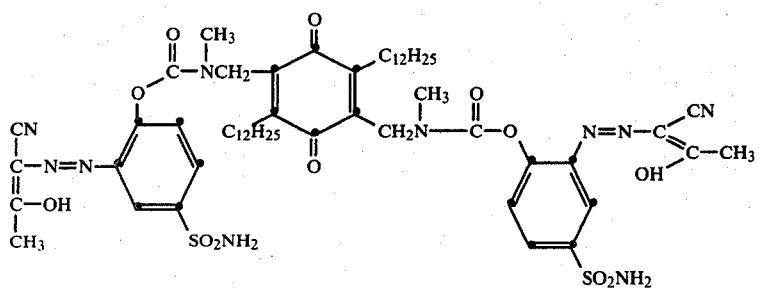

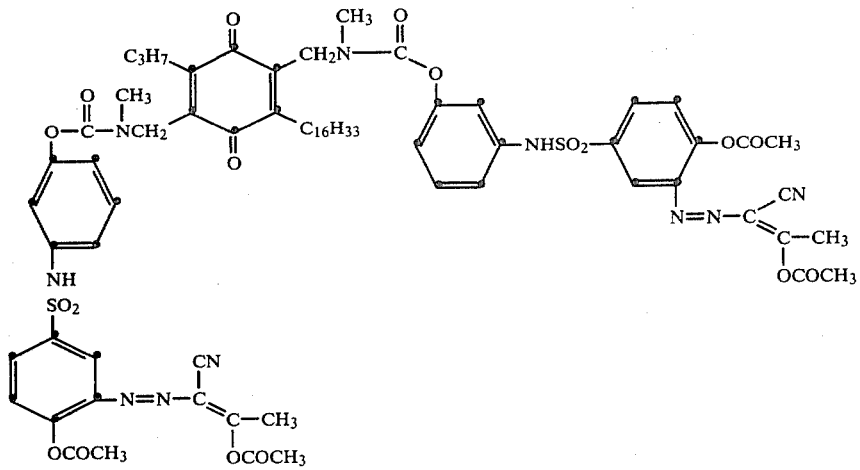
(9)
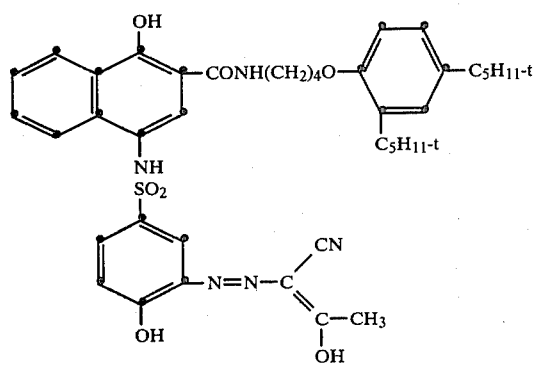
(10)
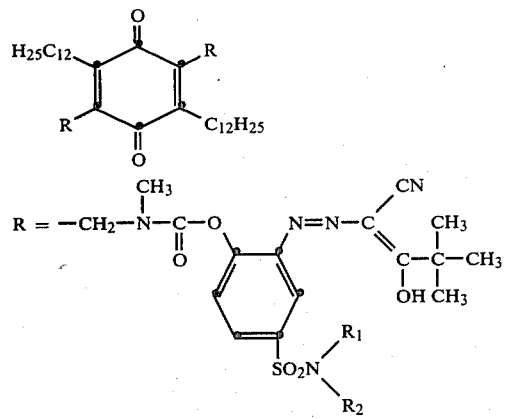
(11-12)
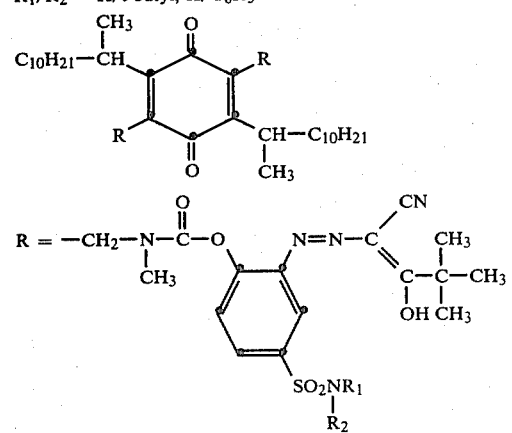
(13-15)

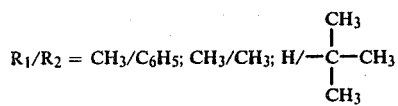
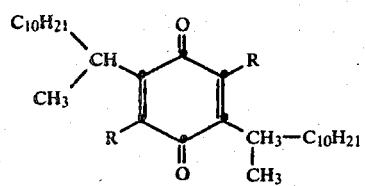
(16)
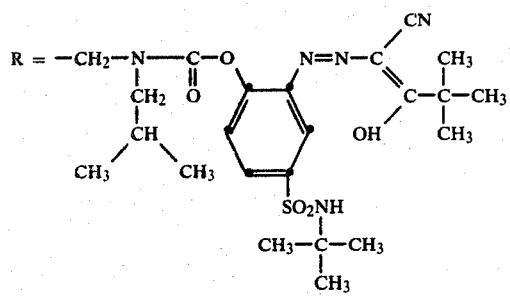
(17-18)
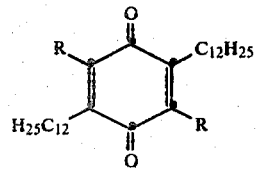
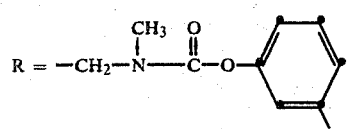
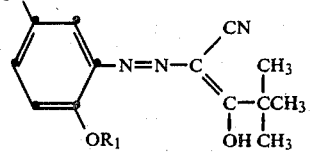
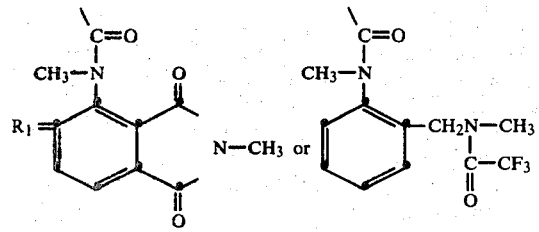
(19)
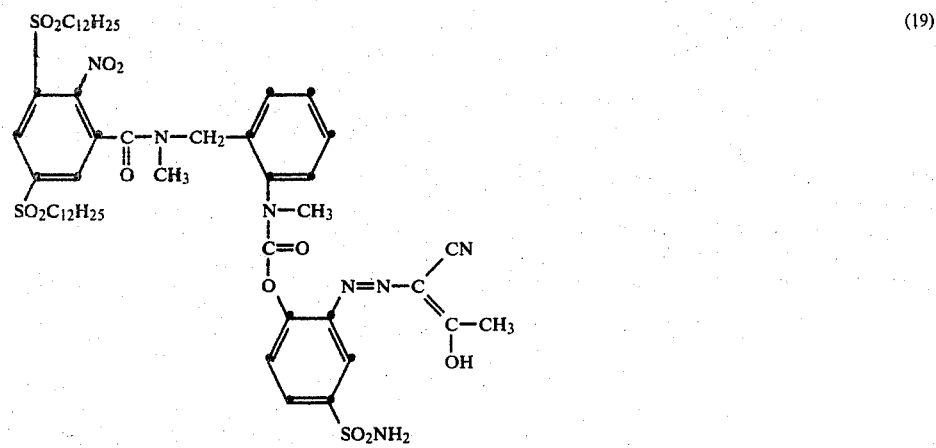

-continued (20)

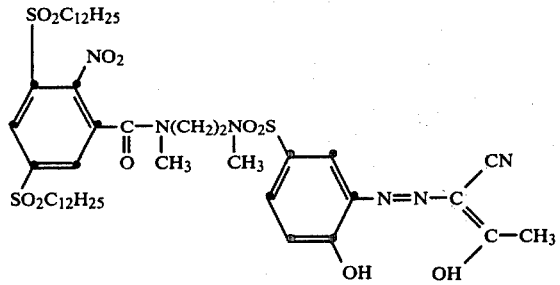

(21)

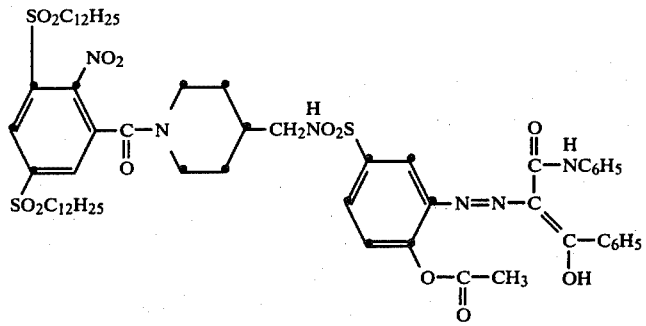

A process for producing a photographic transfer image in color according to the invention comprises:

(a) treating an imagewise-exposed photographic element, as described above, with an alkaline processing composition in the presence of a silver halide developing agent to effect development of each of the exposed silver halide emulsion layers;

(b) the dye-releasing compound then releasing the diffusible azo dye, as described above, imagewise as a function of the development of each of the silver halide emulsion layers;

(c) at least a portion of the imagewise distribution of the azo dye diffusing to a dye image-receiving layer; and (d) contacting the imagewise distribution of azo dye with metal ions, thereby forming a metal-complexed azo dye transfer image.

In another preferred embodiment of the invention, a process for producing a photographic transfer image in color according to the invention comprises:

(a) treating an imagewise-exposed photographic element as described above wherein CAR in the compound has the formula:

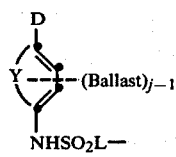

D, Y, L and j being defined as above, with an alkaline processing composition in the presence of a silver halide developing agent to effect development of each of the exposed silver halide emulsion layers, thereby oxidizing the developing agent;

(b) the oxidized developing agent thereby cross-oxidizing the dye-releasing compound;

(c) the cross-oxidized dye-releasing compound then cleaving as a result of alkaline hydrolysis to release the diffusible azo dye imagewise as a function of the imagewise exposure of each of the silver halide emulsion layers;

(d) at least a portion of the imagewise distribution of the azo dye diffusing to a dye image-receiving layer; and (e) contacting the imagewise distribution of azo dye with metal ions, thereby forming a metal-complexed azo dye transfer image.

The azo dyes released from the nondiffusible compounds in accordance with the present invention provide tridentate azo dye ligands that will form coordination complexes in the image-receiving layer with polyvalent metal ions. The metal ions can be present in the image-receiving layer itself or in a layer adjacent thereto, or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II) and cobalt (II) ions.

It is believed that the coordination complex which is formed from the tridentate azo dye ligand according to the invention in one of the preferred embodiments thereof has the following structure:

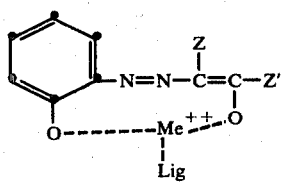

where Me is metal, Lig is one or more ligand groups depending upon the coordination number of the metal ion, such as $H_2O$, Cl, pyridine, etc; and Z and Z' being defined as above.

In accordance with another embodiment of the invention, a photographic element is provided which comprises a support having thereon a coordination complex of a polyvalent metal ion and a compound having the formula:

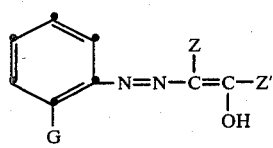

wherein G is a metal chelating group, while Z and Z' are defined as above.

The element usually contains a photographic mordant or image-receiving layer to bind the dye or coordination complex thereto. The structures shown above may also, of course, be substituted in the same manner as described above for the starting compounds from which they are released.

It will be appreciated that, after processing the photographic element described above, there remains in the element, after transfer has taken place, an imagewise distribution of azo dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or a motion picture film, may be produced in this manner. If a direct-positive silver halide emulsion is employed in such photosensitive elements, then a negative color image may be produced.

The photographic element in the above-described process can be treated with an alkaline processing composition to effect or initiate development in any manner. A preferred method for applying processing composition is by use of a rupturable container or pod which contains the composition. In general, the processing composition employed in this invention contains the developing agent for development, although the composition could also be solely an alkaline solution where the developer is incorporated in the photographic element, the image-receiving element or the process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;
(2) a dye image-receiving layer; and
(3) an alkaline processing composition and means for discharging same within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

In the embodiment described above, the dye image-receiving layer may itself contain metal ions, or the metal ions may be present in an adjacent layer, so that the tridentate azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container, containing an alkaline processing composition and an opacifier, is positioned between the top layer and a transparent cover sheet which has thereon a neutralizing layer and a timing layer. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support, and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith, at least one of the dye-releasers being a compound in accordance with the present invention. The dye-releaser associated with each silver halide emulsion layer may be contained either in the silver halide emulsion layer itself or in a layer contiguous to the silver halide emulsion layer.

The concentration of the dye-releasing compounds that are employed in the present invention may be varied over a wide range, depending upon the particular compound employed and the results desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:
N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N′,N′-tetramethyl-p-phenylenediamine
3-methyl-N,N-diethyl-p-phenylenediamine
3-methoxy-N-ethyl-N-ethoxy-p-phenylenediamine, etc.
The non-chromogenic developers in this list are preferred, however, since they avoid any propensity of staining the dye image-receiving layer.

In a preferred embodiment of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process, or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material can be employed as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functions are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which the alkaline composition diffuses through the inert spacer layer. Examples of such timing layers and their functions are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers so long as the materials are accessible to one another.

EXAMPLE 1

Preparation of Compound 1

A sample of 4-amino-N-[4-(2,4-di-t-pentylphenoxy)-butyl]-1-hydroxy-2-naphthamide (3.43 g; 0.07 mole) was dissolved in 100 ml of methylene chloride under nitrogen and α-(2-benzoyloxy-5-chlorosulfonylphenylazo)-β-benzoyloxycinnamonitrile (3.93 g, 0.07 mole) added portionwise. After the addition was complete, pyridine (1.3 g) was added, and the reaction mixture was allowed to stir at room temperature for 7 hours. The mixture was evaporated to dryness and the residue triturated with ethanol. The product was filtered off, washed with hot ethanol and then purified by dissolving it in hot dimethylformamide and adding ethanol. The product was obtained by chilling the solution.

Yield: 4.0 g, m.p. 205° to 207° C.

Intermediates

α-(2-Benzoyloxy-5-chlorosulfonylphenylazo)-β-benzoyloxycinnamonitrile

To a solution of α-(2-benzoyloxy-5-sulfonylphenylazo)-β-benzoyloxycinnamonitrile (10 g) in 50 ml of thionyl chloride was added 3 ml of dimethylformamide. The reaction mixture was allowed to stir at room temperature for 3½ hours. The solvent was evaporated to dryness under vacuum at room temperature. The residue was diluted with ethyl ether (50 ml) to form a white precipitate. The product was filtered off and dried to yield 9.4 g, m.p. 153° to 155° C.

α-(2-Benzoyloxy-5-sulfophenylazo)-β-benzoyloxycinnamonitrile

To a solution of 20 g of α-(2-hydroxy-5-sulfophenylazo-α-benzoylacetonitrile in 20 ml of dry pyridine was added 30 ml of benzoyl chloride. The reaction mixture was heated at reflux for 20 minutes and then cooled to room temperature to form an oily material. The oily material was stirred with 400 ml of ethyl ether to form a white precipitate. The precipitate was collected by filtration and dried to yield 11.1 g, m.p. 193° to 195° C.

α-(2-Hydroxy-5-sulfophenylazo-α-benzoylacetonitrile

2-Aminophenol-4-sulfonic acid (18.9 g) was dissolved in aqueous sodium hydroxide (5 g in 200 ml of water). After the addition of sodium nitrite (7 g), the solution was cooled to 10° C. and added to a mixture of concentrated HCl (25 ml) and 300 g of cracked ice. The diazonium solution was stirred at 0° C. for 15 minutes and then added slowly into a slurry of benzoylacetonitrile (14.5 g), potassium carbonate (30 g) and pyridine (200 ml). When the addition was completed, the reaction mixture was allowed to stir at 0° C. for 1 hour and then at 20° C. for 1 hour. The solution was acidified with concentrated hydrochloric acid. The product precipitated out after the volume of the reaction mixture was reduced to 150 ml. The product was filtered off, and dried to yield 17 g, m.p. 134° to 137° C.

EXAMPLE 2

Preparation of Compound 2

4-Amino-N,N-didodecyl-1-hydroxy-2-naphthamide (8.07 g) was dissolved in 500 ml methylene chloride under nitrogen and α-(2-acetoxy-5-chlorosulfonylphenylazo)acetoacetanilide (6.55 g) added portionwise. After the addition was complete, pyridine (1.3 g) was added and the reaction mixture stirred for 5 hours. At the end of this time, most of the starting material had disappeared. The mixture was evaporated to dryness and the residue triturated with ethanol. The product was filtered off and purified by dissolving it in hot dimethylformamide (50 ml, 80° C.) and adding hot ethanol (400 ml). The first crop of crystals was obtained on chilling.

Yield: 8.2 g, m.p. 142° to 143° C.

Intermediates

α-(2-Acetoxy-5-chlorosulfonylphenylazo)acetoacetanilide

α-(2-Acetoxy-5-sulfophenylazo)acetoacetanilide (20 g) was added to thionyl chloride (100 ml). After the addition of dimethylformamide (4 ml), solution was complete, then followed by precipitation of the product. It was filtered off and dried in the vacuum oven at 40° C.

Yield: 16.7 g, m.p. 225° to 226° C.

α-(2-Acetoxy-5-sulfophenylazo)acetoacetanilide

α-(2-Hydroxy-5-sulfophenylazo)acetoacetanilide (40 g) was dissolved in boiling pyridine (750 ml) and acetic anhydride (100 ml) added. Some material precipitated while the reaction mixture was hot. After being cooled, the product was filtered off and dried.

Yield: 38 g.

α-(2-Hydroxy-5-sulfophenylazo)acetoacetanilide

2-Aminophenol-4-sulfonic acid (18 g) was dissolved in aqueous sodium hydroxide (5 g in 200 ml of water). After the addition of sodium nitrite (7 g), the solution was cooled to 10° C. and added to a mixture of concentrated hydrochloric acid (25 ml) and cracked ice (300 g). The diazonium solution was stirred at 0° C. for 15 minutes and then added slowly to a slurry of acetoacetanilide (17 g), potassium carbonate (30 g), pyridine (200 ml) and ice. When the addition was complete, the reaction mixture was stirred at 10° to 20° C. for 1 hour and then acidified with hydrochloric acid. The product was filtered off and dried.

Yield: 23 g.

EXAMPLE 3

Photographic Element Tests

Table 1 lists examples of the dye-releasing redox compounds (DRR) of this invention. The dyes were prepared as in the previous examples, or by generally analogous methods. Available diffusion hues and light stability data obtained by the following experiments are recorded.

A. Preparation of Single-Layer Light-Sensitive Elements

The DRR compounds were dispersed in di-n-butyl phthalate in a 1:2 ratio, using cyclohexanone as an auxiliary solvent. The dispersion was added to a monodispersed 0.8 μm silver bromide emulsion and coated on a polyester film support. The layer comprised 2.2 g/m² silver, 3.2 g/m² gelatin and $1.1 \times 10^{-3}$ mole/m² of the DRR compound. It was overcoated by a protective gelatin layer at 1.1 g/m² containing a conventional gelatin hardener.

B. Dye Diffusion

The above light-sensitive element was exposed to room light. A viscous processing composition was spread between it and the receiving element described below at 22° C. by passing the transparent "sandwich" between a pair of juxtaposed rollers so that the liquid layer is about 75 μm. The receiving element comprised the following layers coated on a transparent polyester support: (1) a mordant layer containing poly(styrene-co-N-benzyl-N,N-dimethyl-N-vinylbenzylammonium sulfate-co-divinylbenzene) and gelatin, each at 2.2 g/m²; (2) a reflecting layer of titanium dioxide (21.5 g/m²) and gelatin (3.7 g/m²); and (3) an overcoat layer of gelatin (3.8 g/m²). The processing composition comprised per liter of aqueous solution: 20 g of sodium hydroxide, 0.75 g of 4-hydroxymethyl-4-methyl-1-phenyl-3-pyrazolidinone, 10 g of potassium bromide and 25 g of hydroxyethylcellulose.

Dye density appearing in the mordant layer was monitored through the transparent support using a recording reflection densitometer. The dye densities recorded after 30, 60 and 120 seconds are given in the table as a percentage of the ultimate final density. High values represent rapid transfer to the mordant.

C. Hue

A room light-exposed sample of the above light-sensitive element was laminated to a transparent receiving element using the same processing composition as above. The transparent element comprised a polyester support bearing a layer containing the same quaternary ammonium salt copolymer as above (2.2 g/m²), gelatin (3.2 g/m²) and hardener. When the dye transferred to the sample receivers to a density of about 1.0, they were washed in water, metallized by bathing in a 10 percent solution of CuSO₄·5H₂O, washed, soaked in a pH 4 buffer solution and dried. The samples which were left unmetallized were simply washed, soaked in the pH 4 buffer and dried. The wavelength at the maximum density ($\lambda_{max}$) of the spectrophotometric curves is recorded in the table, along with the "half band width" (½ BW), the wavelength range of the curve at half the maximum density. A narrow "half band width" generally designates a pure hue.

D. Light Stability-Fading Test

Sample strips of the light-sensitive element were given a controlled exposure through a step tablet and laminated as described above using the same developing composition to a paper receiving element. This element comprised a polyethylene-coated paper support and a mordant layer of the same composition as on the transparent support in C above. The receivers were metallized, buffered as above and subjected to 10 days of a high-density daylight (5000 footcandles) fading. The loss in density ($\Delta D$) was monitored spectrophotometrically.

TABLE 1

$$\underset{G}{\underset{|}{\text{CAR}}} \underset{}{\text{—N=N—}} \underset{|}{\overset{Z}{C}} \underset{G^1}{\overset{|}{=}} C-Z' \quad \longrightarrow \quad \underset{O\text{-----Me}\pm\pm\text{-O}}{\underset{|}{\text{CAR}}} \underset{}{\text{—N=N—}} \underset{|}{\overset{SO_2NH_2}{\underset{|}{Z}}} \overset{|}{C}=C-Z'$$

| | | | | | DRR COMPOUND | | | COMPLEXED RELEASED DYE | | | | |
|---|---|---|---|---|---|---|---|---|---|---|---|---|
| | | | | | | | | Diffusibility Percent after | Hue of Released Dye | | Chelating | Light Stability |
| | | | | | | | | 30  60  120 | $\lambda_{max}$  ½ BW | | Metal Ion | |
| Compound | CAR | G | G¹* | Z | Z' | | | (seconds) | (nm)  (nm) | | Me++ | $D_o$  $\Delta D$ |
| A | CAR-A | OCOCH₃ | OCOCH₃ | CN | C₆H₅ | — — — | | | 479  82 | | Cu | 1.00  −0.10 |
| 1 | CAR-A | OCOC₆H₅ | OCOPh | CN | C₆H₅ | | | | same released dye | | | |
| 2 | CAR-B | OCOCH₃ | OH | CONHC₆H₅ | CH₃ | 31  65  88 | | | 470  100 | | Cu | 1.05  −0.20 |
| B | CAR-A | OCOCH₃ | OH | CONHC₆H₅ | CH₃ | | | | same released dye | | | |
| C | CAR-C | OCOCH₃ | OH | CONHC₆H₅ | C₆H₅ | 30  58  87 | | | 440  (broad) | | Cu | 1.00  −0.18 |
| D | CAR-A | OCOCH₃ | OH | CONHC₆H₅ | C₆H₅ | | | | same released dye | | | |

TABLE 1-continued

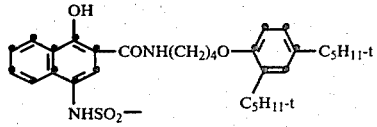

| | DRR COMPOUND | | | | | COMPLEXED RELEASED DYE | | | | | |
|---|---|---|---|---|---|---|---|---|---|---|---|
| | | | | | | Diffusibility Percent after | | | Hue of Released Dye | | Chelating Metal Ion | Light Stability |
| Compound | CAR | G | $G^{1*}$ | Z | Z' | 30 (seconds) | 60 | 120 | $\lambda_{max}$ (nm) | ½ BW (nm) | $Me^{++}$ | $D_o$ | $\Delta D$ |
| E | CAR-C | $OCOCH_3$ | $OCOCH_3$ | CN | $CH_3$ | 47 | 74 | 94 | 460 | 100 | Cu | 0.84 | −0.12 |

*If $G^1$ is OH, the compound is better represented by the keto rather than the enol form.

CAR-A is:

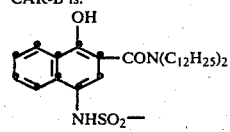

CAR-B is:

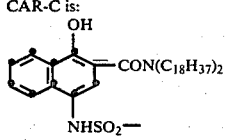

CAR-C is:

OH
[naphthalene structure]—CON($C_{18}H_{37}$)$_2$
NHSO$_2$—

EXAMPLE 4

Released Dyes and Photographic Data

Table 2 lists examples of dyes of the invention which have sulfamoyl substituents, but which have neither been shifted nor linked to dye-releasing carriers. They are the dyes which would be released upon processing from sulfonamidonaphthol carriers, like CAR-A of Table 1.

The hue and light stability measurements were made on mordanted strips like those in Example 3, part C. The dyes were dissolved in an alkaline solution in which the transparent mordanted strips were soaked until the mordant adsorbed a suitable density of dye. The strip was sequentially washed, dipped for a few minutes in a concentrated solution of cupric acetate or nickel acetate, washed, soaked in a pH 4.0 buffer solution, washed and dried. Spectrophotometric curves were measured both before and after 2 days of the high-intensity daylight fading test. The original density at $\lambda_{max}$ and the loss on fading are recorded in the table.

TABLE 2

[structure: SO$_2$NH$_2$ substituted phenyl—N=N—C(Z)=C(Z')—, with O----Me---O chelation]

| | | | Hue of Dye | | Chelating Metal Ion | Light Stability | |
|---|---|---|---|---|---|---|---|
| Compound | Z' | Z | $\lambda_{max}$ (nm) | ½ BW (nm) | $Me^{++}$ | $D_o$ | $\Delta D$ |
| F | $CH_3$ | $CO_2H$ | 440 | 93 | Cu | 1.13 | 0.03 |
| G | $CH_3$ | $CONH_2$ | 430 | 82 | Cu | 1.39 | 0.05 |
| H | $C_6H_5$ | $CONHC_6H_5$ | 448 | 94 | Cu | 1.28 | 0.03 |
| J | $CH_3$ | CN | 452 | 78 | Cu | 1.33 | 0 |
| | | | 462 | 76 | Ni | 1.36 | 0.03 |
| K | $C_6H_5$ | $SO_2CH_3$ | 441 | 110 | Cu | 1.18 | 0.07 |
| L | $nC_4H_9$ | CN | 450 | 72 | Cu | 1010 | 0 |

EXAMPLE 5

Preparation of Compound 8

A sample of α-(2-hydroxy-5-sulfamoyl-phenylazo)acetoacetonitrile (2.80 g; 0.01 mole) was dissolved in dried pyridine (50 ml). 2,5-Didodecyl-3,6-bis(N-methylchloroformamidomethyl)benzoquinone (3.3 g, 0.005 mole) was added gradually to the pyridine solution and the mixture was allowed to react for two hours at room temperature. The reaction mixture was poured onto ice, acidified and filtered to obtain 5 g of crude product. The crude product was dissolved in a minimum amount of dichloromethane and chromatographed on silica gel using a mixed solvent (ethanol/dichloro-methane, 2:98) as the eluting agent. The first yellow fraction was discarded. The second fraction was concentrated to obtain 2.9 g of product ($\epsilon = 3.3 \times 10^4$ at 365 nm).

INTERMEDIATES

Sodium salt of acetoacetonitrile

A solution of sodium methoxide (4.8 g) in absolute ethanol (25 ml) was added gradually to a solution of 5-methylisoxazole (3.4 g) in ethanol (30 ml) at ice bath temperature. The mixture was maintained at 0° C. for 30 minutes and then diluted with anhydrous ethyl ether (150 ml) to precipitate the sodium salt of acetoacetonitrile. After filtration of the mixture, the white precipitate was dissolved in distilled water (50 ml) and treated with a cooled solution of potassium carbonate (24.0 g) in ice (50 g).

2-Hydroxy-5-sulfamoylbenzenediazonium chloride

Sodium nitrite (3.5 g) was added to a solution of 2-amino-5-sulfamoyl-1-phenol (5.6 g) in aqueous sodium hydroxide (1.6 g NaOH, 50 ml $H_2O$). Concentrated hydrochloric acid (10 ml) was added dropwise to this solution at 0° C. for 15 minutes with stirring.

α-(2-Hydroxy-5-sulfamoylphenylazo)acetoacetonitrile

The diazonium salt solution was added to the acetoacetonitrile solution, and the resulting mixture was maintained at 0° C. for 15 minutes and then at room temperature for 60 minutes.

The solution was acidified with concentrated hydrochloric acid and maintained at 0° C. to obtain a yellow precipitate which was collected by filtration and dried; yield, 6.5 g.

EXAMPLE 6

Preparation of Compound 10

SOLUTION A (Sodium salt of acetoacetonitrile)

A solution of sodium methoxide (10.4 g) in absolute ethanol (80 ml) was added dropwise to the solution of 5-methylisozazole (6.8 g) and absolute ethanol (30 ml) maintained in an ice ethanol bath. After 30 minutes, a white precipitate gradually formed; after dilution with ethyl ether (800 ml) and filtration, the white precipitate was re-suspended in a mixture of methanol (900 ml) and sodium acetate (212 g) maintained in an ice bath.

SOLUTION B (Diazonium salt)

4-(3-Amino-4-hydroxybenzenesulfonamido)-N-[4-(2,4-di-t-pentylphenoxy)butyl]-1-hydroxy-2-naphthamide (26.4 g) was dissolved in ethanol (400 ml) and treated with a methanol solution (200 ml) of hydrochloride gas (16.8 g). Isopentyl nitrite (5.7 g) was added dropwise to this mixture at 0° C. After completion of the addition, the reaction mixture was maintained at 0° C. for 30 minutes.

Solution B was added very slowly to Solution A at 0° C. while maintaining the vessel's contents at a basic pH with sodium acetate. After maintaining the mixture at 0° C. for 30 minutes, the reaction vessel was allowed to stand at room temperature for 60 minutes. The solution was acidified with methanol/hydrogen chloride to pH 6.0. The reaction mixture was concentrated to 500 ml in vacuo and filtered to remove sodium chloride and unreacted sodium acetate. The filtrate was concentrated to an oil which, after treating with distilled water (1 liter) for 15 hours, formed a yellow precipitate which was collected by filtration and dried; yield, 26.0 g.

The crude product was re-dissolved in ethyl ether and allowed to stand for 10 minutes at room temperature to form a jelly material which was removed by filtration; the filtrate was concentrated to dryness to yield a solid which was purified by liquid column chromatography using silica gel and a mixture of methanol and dichloromethane (1.5:98.5) as an eluting agent; yield, 11.0 g pure compound.

EXAMPLE 7

Photographic Test-Compound 8

A single-color photosensitive element was prepared by coating on a subbed polyester film support (g/m² in parentheses unless otherwise specified). (1) a blue-sensitive 0.8 μm monodispersed silver bromide gelatin emulsion (1.1 Ag, 3.2 gelatin) and a dispersion of a mixture of (a) Compound 8 (0.51) and (b) a ballasted reducing agent precursor 4-(2-acetoxy-2-pivaloylacetamido)-N-[4-(2,4-di-t-pentylphenoxy)-butyl]-1-hydroxy-2-naphthamide (1.02) dissolved in diethyllauramide (1.53), and (2) an overcoat layer of gelatin (0.55). This element was exposed through a graduated density step tablet to a light source. It was then processed by spreading between it and an image-receiving element at 22° C. a viscous developing composition by passing the transfer "sandwich" between a pair of juxtaposed rollers so that the liquid layer was 75 μm. The receiving element comprised a layer of a mixture of gelatin (2.15) and a polymeric latex mordant, poly(styrene-co-N-benzyl-N,N-dimethyl-N-vinylbenzylammonium sulfate-co-divinylbenzene) (2.15) coated on a polyethylene-coated paper support. The viscous composition contained (per liter of water) 51 g of potassium hydroxide, 3 g of 4-hydroxymethyl-4-methyl-1-phenyl-3-pyrazolidinone, 20 g of potassium bromide, 1.0 g of 5-methylbenzotriazole and 30 g of carboxymethylcellulose.

After 5 minutes, the elements were peeled apart and the receiving element was washed in water and dried. The $D_{max}$ and $D_{min}$ of the yellowish unmetallized dye, read using blue light reflection densitometry, was 0.85 and 0.20, respectively. Metallized with nickel(II) and copper(II) ions, the dye absorbed at $\lambda_{max}$ 462 and 450 nm, respectively.

EXAMPLE 8

Photographic Test-Compound 10

A single-color integral-imaging receiver element was prepared by coating successively on a polyester film support (1) a metallizing layer comprising gelatin (1.08 g/m²) and nickel sulfate hexahydrate (0.58 g/m²), (2) a receiving layer comprising a mixture of gelatin and poly(4-vinylpyridine), (each at 2.15 g/m²), (3) a reflecting layer comprising titanium dioxide and gelatin in a 6.25/1 ratio, (4) an opaque layer of carbon dispersed in gelatin, (5) a layer of didodecylhydroquinone (1.29 g/m²) dispersed in gelatin (1.61 g/m²), (6) a layer comprising gelatin (2.13 g/m²), and a dispersion of Compound 10 (0.95 g/m²), (7) a layer of a blue-sensitized internal image emulsion, as described in Evans, U.S. Pat. No. 3,761,276 (1.85 gAg/m², 1.85 g gelatin/m²), with fogging agents NA-16 and H-25 of Leone et al, U.S. Pat. No. 4,030,925, issued June 21, 1977, and 5-octadecylhydroquinone-2-sulfonic acid (16 g/mole Ag), and (8) a gelatin overcoat layer (0.89 g/m²).

In a comparative coating in which no metal ion is used to chelate the dye, the entire layer 1 was omitted. Layers 1 and 2 above form no part of the invention, as they are the subject of an invention by our coworkers Brust, Hamilton and Wilkes, U.S. Application Ser. No. 003,169, filed Jan. 15, 1979.

This integral element was exposed to a multicolor test object, then processed by spreading between it and a processing cover sheet, as described in Hannie et al, U.S. Pat. No. 4,061,496, at 22° C., a viscous processing composition, as described in said U.S. Pat. No. 4,061,496, by passing the transfer "sandwich" between a pair of juxtaposed rollers so that the liquid layer was about 75 μm. The dye reflection density in the unexposed areas (i.e., $D_{max}$ areas) was measured at selected intervals up to 24 hours with a recording spectrophotometer. The density at $\lambda_{max}$ after 4 minutes was determined from these plots. From the spectrophotometric curves, the final $D_{max}$ and the $\lambda_{max}$ (i.e., wavelength at $D_{max}$) were determined and recorded in Table 3. The light stability was determined by exposing part of the strip to a high intensity daylight (5000 footcandles) light source for two days. Values are given for the original density $D_o$, the final faded density $D_F$ and the density loss $\Delta D$.

TABLE 3

| Metallization | $\lambda_{max}$ (nm) | Light Stability | | |
|---|---|---|---|---|
| | | $D_o$ | $D_F$ | $\Delta D$ |
| Ni++ | 467 | 1.00 | 0.91 | −0.09 |
| None (H) | <400 | 1.00 | 0.54 | −0.46 |

The invention has been described in detail with particular reference to preferred embodiments thereof, but it will be appreciated that variations and modifications can be effected within the spirit and scope of the invention.

What is claimed is:

1. A nondiffusible compound having at least one diffusible azo dye moiety, said compound having the formula:

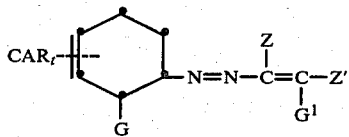

wherein:

G is a metal chelating group, a salt thereof or a hydrolyzable precursor thereof; or a group which together with a

group is CAR, said CAR being bonded to the benzene ring through the oxygen of said

group;

$G^1$ is hydroxy, a salt thereof, or a hydrolyzable precursor thereof;

Z is an electron withdrawing group having the formula $-CON(R)_2$, $-SO_2N(R)_2$, $-COOR$, $-CN$, $SO_2R'$ or $-COR'$, wherein R' is alkyl of 1 to 8 carbon atoms or aryl of 6 to 10 carbon atoms, and each R is H or R';

Z' is alkyl of 1 to 8 carbon atoms, aryl of 6 to 10 carbon atoms or $N(R)_2$;

CAR represents a ballasted carrier moiety which will release said diffusible azo dye as a function of development of a silver halide emulsion layer under alkaline conditions; and t is an integer of 0 to 1, with the proviso that the compound contains at least one but not more than two CAR groups.

2. The compound of claim 1 wherein t is 1 and G is OH, $G^1$ is OH, Z is $-CON(R)_2$ and Z' is alkyl of 1 to 8 carbon atoms.

3. The compound of claim 1 wherein $G^1$ is a hydrolyzable precursor comprising an acyloxy group having the formula $-OCOR^1$, $-OCOOR^1$, or $-OCON(R^1)_2$, wherein each $R^1$ is alkyl having 1 to about 8 carbon atoms or aryl having 6 to about 12 carbon atoms.

4. The compound of claim 1 wherein G is hydroxy; amino; carboxy; sulfonamido; sulfamoyl; a fused nitrogen-containing ring; or a hydrolyzable ester group having the formula $-OCOR^1$, $-OCOOR^1$, or $-COOR^1$, wherein $R^1$ is alkyl having 1 to about 8 carbon atoms or aryl having 6 to about 12 carbon atoms.

5. The compound of claim 1 wherein said CAR is a group having the formula:

(Ballast-Carrier-Link) - wherein:
(a) Ballast is an organic ballasting radical of such molecular size and configuration as to render said compound nondiffusible in a photographic element during development in an alkaline processing composition;
(b) Carrier is an oxidiable acyclic, carbocyclic or heterocyclic moiety; and
(c) Link represents a group which, upon oxidation of said carrier moiety, is capable of being hydrolytically cleaved to release said diffusible azo dye.

6. The compound of claim 5 wherein the Carrier moiety contains atoms according to the following configuration:

$$a(-C=C)_b-$$

wherein:
b is a positive integer of 1 to 2; and
a represents the radicals OH, SH, NH—, or hydrolyzable precursors thereof.

7. The compound of claim 1 wherein said CAR is a group having the formula:

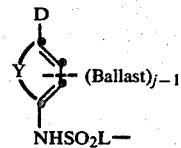

wherein:
(a) Ballast is an organic ballasting radical of such molecular size and configuration as to render said compound nondiffusible in a photographic element during development in an alkaline processing composition;

(b) D is OR² or NHR³ wherein R² is hydrogen or a hydrolyzable moiety and R³ is hydrogen or substituted or unsubstituted alkyl of 1 to 22 carbon atoms;

(c) Y represents the atoms necessary to complete a benzene nucleus, a naphthalene nucleus, or a 5 to 7 membered heterocyclic ring;

(d) j is a positive integer of 1 to 2 and is 2 when D is OR² or NHR³ when R³ is hydrogen or alkyl of less than 8 carbon atoms; and (e) L is a linking group which is $[X—(NR^4—J)_q]_m—$ or $X—J—NR^4—$ wherein:

(i) X represents a bivalent linking group of the formula $—R^5—L'_n—R^5_p—$ where each $R^5$ can be the same or different and each represents alkylene having 1 to about 8 carbon atoms; phenylene; or substituted phenylene having 6 to about 9 carbon atoms;

(ii) L' represents a bivalent radical selected from oxy, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents hydrogen, or alkyl having 1 to about 6 carbon atoms;

(vi) J represents a bivalent radical selected from sulfonyl or carbonyl;

(vii) q represents an integer of 0 or 1; and (viii) m represents an integer of 0, 1 or 2.

8. The compound of claim 7 wherein D is OH, j is 2, Y is a naphthalene nucleus, G is OH, G¹ is OH and t is 1.

9. The compound of claim 1 wherein said CAR will release said diffusible azo dye as an inverse function of development of a silver halide emulsion layer under alkaline conditions.

10. The compound of claim 9 wherein said CAR is a group having the formula:

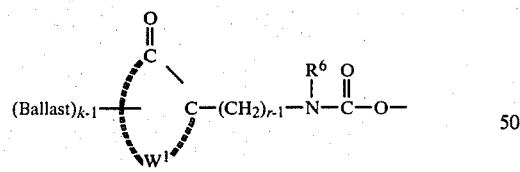

wherein:

Ballast is an organic ballasting radical of such molecular size and configuration as to render said compound nondiffusible in a photographic element during said development in an alkaline processing composition;

W¹ represents at least the atoms necessary to complete a quinone nucleus;

r is a positive integer of 1 or 2;

$R^6$ is alkyl having 1 to about 40 carbon atoms or aryl having 6 to about 40 carbon atoms; and k is a positive integer of 1 to 2 and is 2 when $R^6$ has less than 8 carbon atoms.

11. The compound of claim 9 wherein said CAR is a group having the formula:

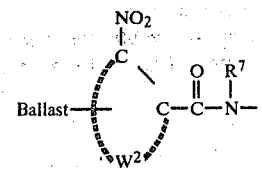

wherein:

Ballast is an organic ballasting radical of such molecular size and configuration as to render said compound nondiffusible in a photographic element during said development in an alkaline processing composition;

W² represents at least the atoms necessary to complete a benzene nucleus; and $R^7$ is alkyl having 1 to about 4 carbon atoms.

12. The compound of claim 9 wherein said CAR is a group having the formula:

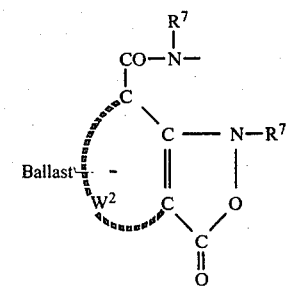

wherein:

Ballast is an organic ballasting radical of such molecular size and configuration as to render said compound nondiffusible in a photographic element during said development in an alkaline processing composition;

W² represents at least the atoms necessary to complete a benzene nucleus; and $R^7$ is alkyl having 1 to about 4 carbon atoms.

13. The compound of claim 9 wherein said CAR is a group having the formula:

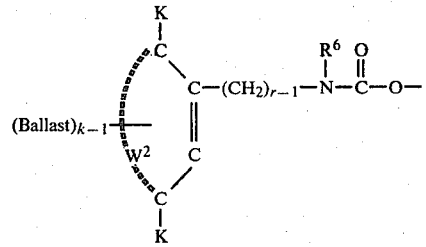

wherein:

Ballast is an organic ballasting radical of such molecular size and configuration as to render said compound nondiffusible in a photographic element during said development in an alkaline processing composition;

W² represents at least the atoms necessary to complete a benzene nucleus;

r is a positive integer of 1 or 2;

$R^6$ is alkyl having 1 to about 40 carbon atoms or aryl having 6 to about 40 carbon atoms;

k is a positive integer of 1 to 2 and is 2 when $R^6$ has less than 8 carbon atoms; and
K is OH or a hydrolyzable precursor thereof.
14. The compound of claim 1 which has the formula:
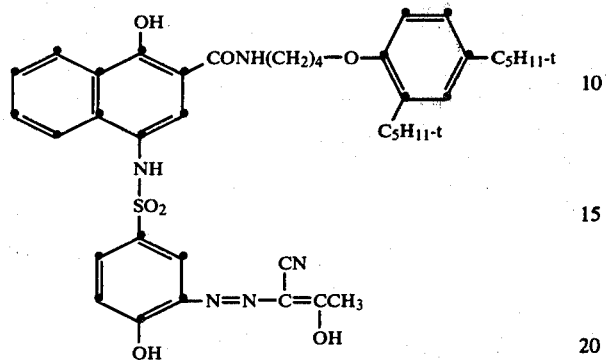
15. The compound of claim 1 which has the formula:
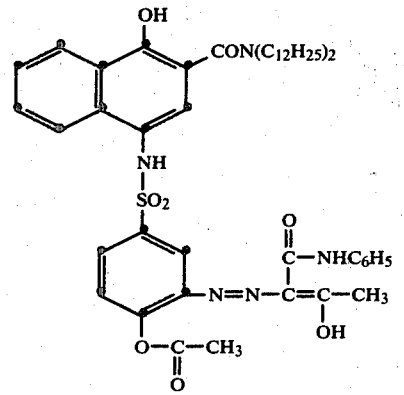
16. The compound of claim 1 which has the formula:
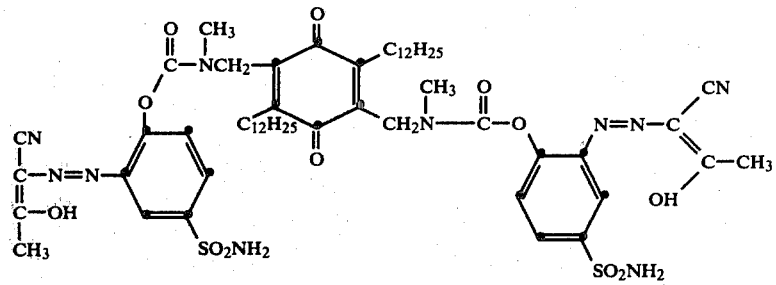
* * * * *